(12) United States Patent
Hu et al.

(10) Patent No.: US 7,906,561 B2
(45) Date of Patent: Mar. 15, 2011

(54) CROSS-LINKED POLYOLEFIN FOAM

(75) Inventors: Jianzhong Hu, Cambridge (CA);
Salvatore D'Uva, Brantford (CA);
Arthur Tinson, Hamilton (CA)

(73) Assignee: Ingenia Polymers, Inc., Houston, TX (US)

( * ) Notice: Subject to any disclaimer, the term of this patent is extended or adjusted under 35 U.S.C. 154(b) by 405 days.

(21) Appl. No.: 11/998,973

(22) Filed: Dec. 3, 2007

(65) Prior Publication Data

US 2008/0281009 A1    Nov. 13, 2008

Related U.S. Application Data

(60) Provisional application No. 60/872,711, filed on Dec. 4, 2006.

(51) Int. Cl.
*C08J 9/00* (2006.01)
*C08J 9/02* (2006.01)
*C08J 9/06* (2006.01)
*C08F 110/00* (2006.01)

(52) U.S. Cl. .............. 521/149; 521/88; 521/94; 521/95; 521/97; 521/99; 521/142; 521/143

(58) Field of Classification Search .................. 521/143, 521/88, 93, 94, 95, 97, 98, 99, 142, 149
See application file for complete search history.

(56) References Cited

U.S. PATENT DOCUMENTS

| | | | |
|---|---|---|---|
| 3,646,155 A | 2/1972 | George | |
| 4,186,068 A | 1/1980 | Rubens | |
| 4,333,898 A | 6/1982 | Schmidtchen | |
| 4,591,606 A | 5/1986 | Bergstroem | |
| 4,870,111 A | 9/1989 | Pontiff et al. | |
| 5,026,736 A * | 6/1991 | Pontiff | 521/60 |
| 5,589,519 A | 12/1996 | Knaus | |
| 5,763,498 A | 6/1998 | Knaus | |
| 5,844,009 A * | 12/1998 | Hurley et al. | 521/112 |
| 6,124,370 A | 9/2000 | Walton et al. | |
| 6,812,262 B2 * | 11/2004 | Abe | 521/89 |
| 2003/0087976 A1 | 5/2003 | Bambara et al. | |

FOREIGN PATENT DOCUMENTS

| | | |
|---|---|---|
| EP | 0972791 A2 | 1/2000 |
| EP | 1354912 A1 | 10/2003 |
| GB | 1286460 | 8/1972 |
| GB | 1408154 | 10/1975 |
| GB | 1541271 | 2/1979 |
| JP | 57-208006 | 6/1981 |
| JP | 60-254520 | 5/1984 |
| JP | 62-106947 | 5/1987 |

OTHER PUBLICATIONS

European Patent Office, International Search Report and Written Opinion, Apr. 24, 2008.

* cited by examiner

*Primary Examiner* — Randy Gulakowski
*Assistant Examiner* — Kara Negrelli
(74) *Attorney, Agent, or Firm* — Jackson Walker L.L.P.

(57) ABSTRACT

The invention pertains to a process for producing a cross-linked polyolefin foam in a continuous process using standard processing equipment without using a moisture cross-linking step after processing. In this method, a vinyl functional silane compound is melt grafted onto a low density polyethylene in the presence of a free radical generator. The resulting silane grafted polyethylene resin is mixed and melted with a blowing agent in a continuous process in the presence of water to form a vinyl functional silane foam.

9 Claims, 1 Drawing Sheet

CROSS-LINKED POLYOLEFIN FOAM

This application claims priority to U.S. Provisional Patent Application Ser. No. 60/872,711, entitled "CROSS-LINKED POLYOLEFIN FOAM," filed on Dec. 4, 2006, the entire content of which is hereby incorporated by reference.

BACKGROUND

This invention relates to a method of producing a cross-linked polyolefin foam in a continuous process without using a moisture cross-linking step after processing.

Some thermoplastic polymers, such as polyethylene, are not suitable for higher temperature applications because they soften and lose their physical properties. The cross-linking of polyethylene changes the polymer from a thermoplastic to a thermoset, resulting in a more durable, heat resistant material with improved mechanical properties. Applications of cross linking polymers include extrusion molding, pipe molding, wire coating and foams.

There are three primary techniques used to cross-link polyolefins: (1) chemical cross-linking using peroxides (2) electron beam irradiation and (3) moisture cross-linking. Chemical and irradiation cross-linking techniques require considerable capital investments, large manufacturing areas, and complex equipment. U.S. Pat. No. 4,186,068 describes a method of producing high density cross-linked polyethylene foams via a radiation method. Closed foam cells of uniform structure were created. Moisture cross-linking was first developed by Dow Corning, known as the Sioplas process (British Patent No. 1,286,460). Cross-linking takes place using silane chemistry and moisture with moderate costing equipment. Silane substituents are introduced onto the polymeric backbone via melt grafting in the presence of a peroxide catalyst. Silane groups will hydrolyze in the presence of moisture to give silanols (—Si—OH) and then condense to siloxanes (—Si—O—Si—). The siloxane structure will become a crosslink between the polyethylene chains. U.S. Pat. No. 3,646,155 describes a process for obtaining a composition of a cross-linkable polyethylene by extruding a blend of polyethylene, a peroxide and a vinylalkoxysilane.

A disadvantage of the moisture cross-linking method is its slow reaction kinetics. It is often necessary to cure the plastic in hot water or a high humidity tank at 80° C. or above for 24 to 36 hours to promote cross-linking. Several attempts have been made to reduce the cross-linking time. These include the introduction of a catalyst to a silane grafted polymer (Japanese Patent No. A-57-208006, Japanese Patent No. A-62-106947) and a method where the contact with moisture is enhanced (Japanese Patent No. A-60-2545520).

Over the past few decades, polymeric foams have garnered rapid growth in the plastics industry. The many benefits of polymeric foams include weight reduction, superior insulating abilities, exceptional strength to weight ratio and energy absorption (shock, vibration and sound). Foams have been prepared in a variety of polymers such as polyurethane, polystyrene, polyvinyl chloride, epoxys and polyolefins. Polymeric foams have been used in a wide variety of applications including automotive, packaging, insulation, flotation, furniture, bedding, textiles and toys to name a few. Several different processing techniques have been used to produce foams including compression molding, extrusion, injection molding, rotational molding and cast film. The preparation of silane grafted cross-linked polyolefin foams is described in U.S. Pat. No. 4,870,111, U.S. Pat. No. 5,589,519, U.S. Pat. No. 5,844,009, U.S. Pat. No. 4,591,606, and U.S. Pat. No. 6,812,262.

U.S. Pat. No. 4,870,111 describes a method of producing moldable foam beads comprising a silane-crosslinked polyolefin foam using a silane-grafted polyethylene.

U.S. Pat. No. 5,589,519 describes a method and apparatus for producing a lightly cross-linked polyolefin foam using an extruder.

U.S. Pat. No. 5,844,009 describes a method of forming low density polyethylene (LDPE) cross-linked foams with the use of physical-blowing agents and a silane-grafted polyolefin resin.

U.S. Pat. No. 4,591,606 describes a method of forming a silane-cross-linked polyolefin foam produced by extruding a mixture containing polyethylene, silane, a condensing catalyst and water acting as foaming agent.

U.S. Pat. No. 6,812,262 describes a method of preparing a silane-crosslinking polyolefin foam with the use of organic and inorganic blowing agents and a silane grafted polyolefin. Foaming is carried out immediately after heat molding without the conventional moisture operation yielding a crosslinked foam with superior heat resistance properties.

SUMMARY

The object of this invention is to produce a cross-linked polyolefin foam in a continuous process using standard processing equipment without using a moisture cross-linking step after processing.

In accordance with one aspect of the present invention, a silane-crosslinked polyolefin foam has been produced. The polyolefin is most preferably a high melt strength low density polyethylene but is not restricted to medium density polyethylene, linear low density polyethylene, polypropylene, and copolymers of olefin monomers.

In a preferred embodiment of the invention, the silane cross-linked polyolefin foam is produced by a process comprising the general steps of:
  (a) Melt grafting a vinyl functional silane onto a polyolefin backbone using an extruder;
  (b) Melt blending a silanol condensation catalyst with a polyolefin in an extruder to produce a catalyst master batch formulation. This step is beneficial to improve cross-linking but is not a necessary step; and
  (c) Mixing and melting the components of (a) and (b), or (a) only, with a chemical or physical blowing agent in a continuous process. Furthermore, water molecules must be present via release from a chemical blowing agent or other additives or direct addition of water. The chemical blowing agent may be added independently or within a masterbatch formulation. Cross linking and foaming reactions occur during processing to produce the silane cross linked foam.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

Figure 1:
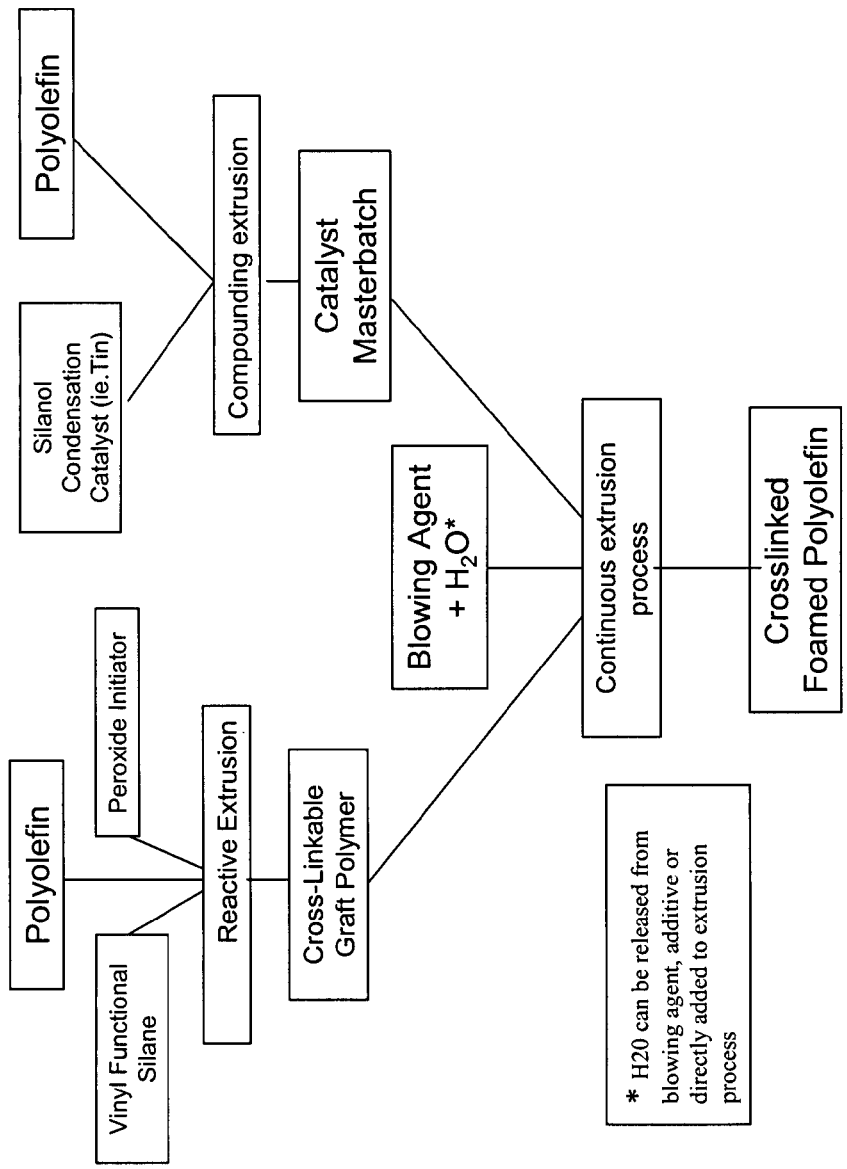
FIG. 1 shows a flow chart of a preferred process for making a crosslinked polyolefin foam.

As a result of a broad investigation, it has been found that a mixture of a silane grafted polyethylene resin, polyethylene resin, silanol condensation catalyst masterbatch, a blowing agent and/or a water releasing agent forms a silane cross-linking expandable polyolefin foam.

The silane cross-linking expandable polyolefin foam composition comprises:

A mixture comprising approximately:
- (a) 10-99.5% by weight of a silane grafted polyethylene resin obtained by melt extruding i) A low density polyethylene with ii) 0.1-5% by weight of a vinyl functional silane compound and iii) 0.05-0.5% by weight of a free radical generator;
- (b) 90-0% by weight of a low density polyethylene resin as described above;
- (c) 0-5% by weight of a silanol condensation catalyst masterbatch obtained by melt extruding i) 95% by weight of a low density polyethylene ii) 5% by weight of a silanol condensation catalyst and optionally iii) 0.01-1% by weight of a primary or secondary antioxidant; and
- (d) 0.5-20% by weight of a chemical or physical blowing agent. If the blowing agent does not release water on decomposition, 0-10% by weight of a water releasing additive is required.

Wherein for item (c) above, the silanol condensation catalyst may be a higher or lower % by weight to produce a masterbatch of different silanol condensation catalyst % by weight. If so, the corresponding letdown of said masterbatch can be used according to the specified range of 0-5% by weight into the polyethylene resin.

Weight % is calculated by dividing the weight of a reagent by the total weight of a mixture to which it is added subsequent to the addition of the reagent. For example, adding 1 gram of a reagent A to 99 grams of a reagent B, thereby forming 100 grams of a mixture A+B would constitute adding 1 weight % of the reagent A to the mixture. Weight % is equivalent to % by weight.

The low density polyethylene used herein can be any materials falling within the scope of a low density polyethylene having a melt index of 0.1-100 g/10 min and a density of 0.870-0.945 g/cm$^3$, most preferably a melt index of 0.1-2 and a density of 0.870 to 0.920 g/cm$^3$. The low density polyethylene can be attained through various polymerization methods such as gas phase method, solution method, and suspension polymerization method under medium, low or high-pressure conditions, using ethylene and an α-olefin in the presence of various catalysts such as Ziegler-based catalysts, metallocene-based catalysts, vanadium-based catalysts, and chromium-based catalysts. Examples of the α-olefin include α-olefins having 3-12 carbon atoms such as propylene, butene-1, pentene-1, octene-1,4-methylpentene-1,4-methyl-hexene-1,4,4-di-methylpentene-1, nonene-1, decene-1, undecene-1, and dodecene-1.

The vinyl functional silane compound used to graft onto the low density polyethylene is represented by the formula:

$$RR'SiY_2$$

where R is a monovalent olefinic unsaturated hydrocarbon group, Y is a hydrolysable organic group, and R' is a monovalent hydrocarbon group other than aliphatic unsaturated hydrocarbons or is identical with Y. The presumed purpose of the vinyl functional silane is to create a crosslinking point among the low density polyethylene molecular chains. Examples of silane compounds may include vinyl trimethoxysilane, vinyltriethoxysilane, vinyl tributoxysilane, allyl trimethoxysilane and allyl triethoxysilane. The amount of vinyl functional silane added is approximately 0.1 to 5 weight % and most preferably approximately 0.1 to 3 weight %.

The free radical generator used acts as an initiator of the silane graft reaction. Examples of free radical generators that may be used include organic peroxides such as dicumyl peroxide, di-t-butyl peroxide, t-butylcumyl peroxide and dibenzoyl peroxide. The amount of free radical generator added is approximately 0.05 to 0.5 weight % and most preferably approximately 0.05 to 0.25 weight %.

The silane grafted polyethylene can be processed using conventional extrusion or melt mixing methods including a Brabender mixer, Banbury mixer, single screw or twin screw extruders. Most preferably the vinyl functional silane and organic peroxide used is vinyltrimethoxy silane and dicumyl peroxide.

The silanol condensation catalyst masterbatch consists of low density polyethylene, an organotin catalyst, and an antioxidant. The organotin catalyst acts as an initiator for the cross linking reaction in the presence of water. Organotin catalysts include dibutyltin dilaurate, dibutyltin oxide, dibutyltin diacetate, butyl stannoic acid, dioctyltin dilaurate, dioctyltin maleate, butyltin tris (2-ethylhexoate), and hydrated monobutyltin oxide. The antioxidant used in the catalyst masterbatch may include all forms of primary phenolic antioxidants, secondary phosphate or thioester antioxidants or a combination of primary and secondary antioxidants. The catalyst masterbatch can be processed using conventional extrusion or melt mixing methods including a Brabender mixer, Banbury mixer, single screw or twin screw extruders.

The blowing agent used generates a gas suitable to foam the silane grafted polyethylene resin. The blowing agent may be a chemical or physical blowing agent. The chemical blowing agent may be organic or inorganic. The organic blowing agent decomposes during melt processing to generate a gas resulting in subsequent foaming and also generates an acidic compound and or water on decomposition at foaming to promote moisture cross linking of the silane grafted polyethylene resin. Examples of organic blowing agents include azo compounds (azodicarbonamide, azohex-hydrobenzonitrile, diazoaminobenzene), nitroso compounds (N,N'-dinitroso-pentamethylenetetramine, N,N'-dinitroso-N,N'-dimethylphthalamide) and diazide compounds (terephthaldiazide, p-t-butylbenzazide).

Most preferably, an inorganic chemical blowing agent is used in combination with an organic acid and surfactant in a masterbatch formulation. The inorganic agent used as a blowing agent may include sodium bicarbonate, ammonium bicarbonate and ammonium carbonate. The blowing agent masterbatch consists of approximately 60-80% by weight of a low melting point polymer carrier resin, approximately 2-10% by weight of an organic surfactant, approximately 5-20% by weight of an organic acid and approximately 5-20% by weight of an inorganic blowing agent. The low melt carrier resin used herein can be any materials falling within the scope of having a melting point range of approximately 40-105° C., most preferably a melting point range of approximately 80-100° C. The carrier resin may include acrylate copolymers including vinyl, butyl, ethyl and methyl acrylates. The organic surfactant used are long chain fatty acid amides such as behenamide, erucamide, oleamide, stearamide, oleyl palmitamide, stearyl erucamide, ethylene bis-stearamide and ethylene bis-oleamide. The organic acid used reacts with the inorganic blowing agent generating a gas and an acidic substance and/or water as a decomposition product at foaming to promote moisture crosslinking of a silane graft group. Examples of organic acids include citric, stearic, oleic, phthalic and maleic acids.

The blowing agent masterbatch can be processed using conventional extrusion or melt mixing methods including a Brabender mixer, Banbury mixer, single screw, or twin screw extruders.

Alternatively, a physical blowing agent in combination with a water releasing additive can be used. Physical foaming agents include low molecular weight organic compounds including $C_1$-$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$-$C_5$ organohalogens, $C_1$-$C_6$ alcohols, $C_1$-$C_6$ ethers, $C_1$-$C_5$ esters, $C_1$-$C_5$ amines, ammonia, nitrogen, carbon dioxide, neon, or helium. The preferred physical foaming agent concentration prior to expanding the foam is between 0.1 and 20 weight %. The water releasing compounds include compounds which release water at normal processing temperatures where foaming and crosslinking can occur simultaneously. Examples include alumina trihydrate, hydrated calcium sulfate, hydrotalcite and the like. Water may also be directly added to the process as a source for moisture. The invention may comprise any combination of a blowing agent, either physical or chemical, as well as water molecules, whether chemically released or directly added to the process.

The preparation of the silane crosslinking polyolefin foam can be processed continuously using conventional extrusion methods including single or twin screw extruders. The silane crosslinking foam has a gel fraction of approximately 1% by weight or more, preferably approximately 1-10% by weight.

The gel fraction was measured by the following technique. A sample of the silane crosslinked polyolefin foam was immersed in boiling xylene at approximately 144° C. and refluxed for around 16 hours. The samples were dried in an oven at approximately 170° C. for around 2 hrs. The gel fraction was calculated by dividing the residual weight by the weight of the foam before immersion.

The invention is described in more detail in the following examples. It is understood that the invention is not limited thereto.

Example 1

3 wt % of vinyltrimethoxysilane (VTMS) is melt grafted onto a low density polyethylene (LDPE) (LFY 819A—Nova Chemicals) using 0.05 wt % of dicumyl peroxide as a catalyst. Melt grafting is achieved via a ZSK-30 (Coperion) twin screw extruder with a melt temperature of 180° C. and screw speed of 400 RPM. A 50 gram foam masterbatch consisting of 76 wt % ethylene vinyl acetate (EVA 2030—AT Plastics), 10 wt % air milled sodium bicarbonate (USP Grade 3), 10 wt % citric acid and 4 wt % behenamide is prepared in a Brabender Mixer. Mixing conditions are 100° C. for 1 minute. The masterbatch is subsequently cold pressed at 70° F. 86.4 wt % LDPE, 9.6 wt % of a 3% grafted VTMS LDPE and 4 wt % foam masterbatch are dry blended, fed and extruded through a blown film line. The resultant cross linked foam has a gel content of 2.6% and foam density of 0.576 g/cc.

Example 2

3 wt % of vinyltrimethoxysilane (VTMS) is melt grafted onto a low density polyethylene (LDPE) (LFY 819A—Nova Chemicals) using 0.05 wt % of dicumyl peroxide as a catalyst. Melt grafting is achieved via a ZSK-30 (Coperion) twin screw extruder with a melt temperature of 180° C. and screw speed of 400 RPM. A 50 gram foam masterbatch consisting of 76 wt % ethylene vinyl acetate (EVA 2030—AT Plastics), 10 wt % air milled sodium bicarbonate (USP Grade 3), 10 wt % citric acid and 4 wt % behenamide is prepared in a Brabender Mixer. Mixing conditions are 100° C. for 1 minute. The masterbatch is subsequently cold pressed at 70° F. 96 wt % of a 3 wt % grafted VTMS and 4 wt % foam masterbatch are dry blended, fed and extruded through a blown film line. The resultant cross linked foam has a gel content of 51.3% and foam density of 0.718 g/cc.

Example 3

Examples 3 and 4 demonstrate how the use of a tin catalyst can aid in the cross linking reaction.

1 wt % of vinyltrimethoxysilane (VTMS) is melt grafted onto a low density polyethylene (LDPE) (LFY 819A—Nova Chemicals) using 0.05 wt % of dicumyl peroxide as a catalyst. Melt grafting is achieved via a ZSK-30 (Coperion) twin screw extruder with a melt temperature of 180° C. and screw speed of 400 RPM. A 50 gram foam masterbatch consisting of 76 wt % ethylene vinyl acetate (EVA 2030—AT Plastics), 10 wt % air milled sodium bicarbonate (USP Grade 3), 10 wt % citric acid and 4 wt % behenamide is prepared in a Brabender Mixer. Brabender mixing conditions are 100° C. for 1 minute. The masterbatch is subsequently cold pressed at 70° F. 96 wt % of a 1% grafted VTMS and 4 wt % foam masterbatch are dry blended, fed and extruded through a blown film line. The resultant cross linked foam has a gel content of 53.5% and foam density of 0.714 g/cc.

Example 4

1 wt % of vinyltrimethoxysilane (VTMS) is melt grafted onto a low density polyethylene (LDPE) (LFY 819A—Nova Chemicals) using 0.05 wt % of dicumyl peroxide as a catalyst. Melt grafting is achieved via a ZSK-30 (Coperion) twin screw extruder with a melt temperature of 180° C. and screw speed of 400 RPM. A tin catalyst masterbatch is prepared by melt mixing 5 wt % of dibutyl tin dilaurate (Fascat 4020—Arkema) with 94.9 wt % LDPE and 0.1 wt % antioxidant (Irganox 1010—Ciba). Melt mixing is achieved via a ZSK-30 (Coperion) twin screw extruder with a melt temperature of 180° C. and screw speed of 300 RPM. A 50 gram foam masterbatch consisting of 76 wt % ethylene vinyl acetate (EVA 2030—AT Plastics), 10 wt % air milled sodium bicarbonate (USP Grade 3), 10 wt % citric acid and 4 wt % behenamide is prepared in a Brabender Mixer. Brabender mixing conditions are 100° C. for 1 minute. The masterbatch is subsequently cold pressed at 70° F. 91.2 wt % of a 1% grafted VTMS, 4.8 wt % of a tin catalyst masterbatch and 4 wt % foam masterbatch are dry blended, fed and extruded through a blown film line. The resultant cross linked foam has a gel content of 57.1% and foam density of 0.658 g/cc.

Example 5

Example 5 demonstrates how the crosslinking reaction occurs in situ during processing and does not require additional moisture curing as in typical cross-linking applications of polyethylene.

3 wt % of vinyltriethoxysilane (VTES) is melt grafted onto a low density polyethylene (LDPE) (LFY 819A—Nova Chemicals) using 0.05 wt % of dicumyl peroxide as a catalyst. Melt grafting is achieved via a ZSK-30 (Coperion) twin screw extruder with a melt temperature of 180° C. and screw speed of 300 RPM. A tin catalyst masterbatch is prepared by melt mixing 5 wt % of dibutyl tin dilaurate (Fascat 4020—

Arkema) with 94.9 wt % LDPE and 0.1 wt % antioxidant (Irganox 1010—Ciba). Melt mixing is achieved via a ZSK-30 (Coperion) twin screw extruder with a melt temperature of 180° C. and screw speed of 300 RPM. A 50 gram foam masterbatch consisting of 76 wt % ethylene vinyl acetate (EVA 2030—AT Plastics), 10 wt % air milled sodium bicarbonate (USP Grade 3), 10 wt % citric acid and 4 wt % behenamide is prepared in a Brabender Mixer. Brabender mixing conditions are 100° C. for 1 minute. The masterbatch is subsequently cold pressed at 70° F. 91.2 wt % of a 3% grafted VTES, 4.8 wt % of a tin catalyst masterbatch and 4 wt % foam masterbatch are dry blended, fed and extruded through a blown film line. The gel content of the foam was 69.7%. The foam was treated in a hot water bath at 80° C. for a 24 hour period. After 5 hours a sample of foam was pulled. The gel content of the foam after 5 hours was 66.7%. After 24 hours, a sample of foam was pulled from the bath. The gel content of the foam after 24 hours was 65.2%.

REFERENCES CITED

The following references and patents, to the extent that they provide exemplary procedural or other details supplementary to those set forth herein, are specifically incorporated herein by reference.
U.S. Patent Documents
U.S. Pat. No. 4,186,068
U.S. Pat. No. 3,646,155
U.S. Pat. No. 4,870,111
U.S. Pat. No. 5,589,519
U.S. Pat. No. 5,844,009
U.S. Pat. No. 4,591,606
U.S. Pat. No. 6,812,262
U.S. Pat. No. 5,844,009
U.S. Pat. No. 4,591,606
U.S. Pat. No. 6,812,262
International Patent Documents
British Patent 1,286,460
Japanese Patent A-57-208006
Japanese Patent A-62-106947
Japanese Patent A-60-2545520

What is claimed:

1. A method to produce a silane cross-linked polyolefin foam, comprising:
   (a) melt grafting a vinyl functional silane compound onto a low density polyethylene in the presence of a free radical generator to form a silane grafted polyethylene resin; and
   (b) mixing and melting the silane grafted polyethylene resin with a blowing agent in a continuous process in the presence of water to form a foam reaction mixture, wherein the blowing agent comprises a masterbatch formulation comprising, based on a weight of the blowing agent:
   5 to 20% by weight of an inorganic blowing agent;
   5 to 20% by weight of an organic acid;
   2 to 10% by weight of an organic surfactant; and
   60 to 80% by weight of a low melting point polymer resin
   which are mixed together to form a masterbatch formulation having a blowing agent function.

2. The method of claim 1 wherein the low melting point polymer resin comprises a material having a melting point range of approximately 40° C. to approximately 105° C.

3. The method of claim 1 wherein the low melting point polymer resin comprises a material having a melting point range of approximately 80° C. to approximately 100° C.

4. The method of claim 1 wherein the low melting point polymer resin comprises vinyl, butyl, ethyl, or methyl acrylates.

5. The method of claim 1 wherein the organic surfactant comprises behenamide, erucamide, oleamide, stearamide, oleyl palmitamide, stearyl erucamide, ethylene bis-stearamide, or ethylene bis-oleamide.

6. The method of claim 1 wherein the organic acid comprises citric acid, stearic acid, oleic acid, phthalic acid, or maleic acid.

7. A method to produce a silane cross-linked polyolefin foam, comprising:
   (a) melt grafting a vinyl functional silane compound onto a low density polyethylene in the presence of a free radical generator to form a silane grafted polyethylene resin; and
   (b) mixing and melting the silane grafted polyethylene resin with a blowing agent in a continuous in situ process in the presence of water to form a foam reaction mixture,
   wherein the blowing agent comprises a masterbatch formulation comprising, based on a weight of the blowing agent:
   5 to 20% by weight of an inorganic blowing agent;
   5 to 20% by weight of organic acid;
   2 to 10% by weight of an organic surfactant; and
   60 to 80% by weight of a low melting point resin
   which are mixed together to form a masterbatch formulation having a blowing agent function, and
   wherein the silane crosslinking polyolefin foam is processed continuously using conventional extrusion methods.

8. The silane cross-linked polyolefin foam of claim 7, wherein the silane cross-linked polyolefin foam has a gel fraction of approximately 1% by weight or more.

9. The silane cross-linked polyolefin foam of claim 7, wherein the silane cross-linked polyolefin foam has a gel fraction of approximately 1 to 10% by weight.

* * * * *